US007809097B2

(12) United States Patent
Wang et al.

(10) Patent No.: US 7,809,097 B2
(45) Date of Patent: Oct. 5, 2010

(54) FRAME TIMING SYNCHRONIZATION FOR ORTHOGONAL FREQUENCY DIVISION MULTIPLEXING (OFDM)

(75) Inventors: Dong Wang, Ossining, NY (US); Jinyun Zhang, Cambridge, MA (US)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1137 days.

(21) Appl. No.: 11/376,287

(22) Filed: Mar. 16, 2006

(65) Prior Publication Data

US 2007/0217524 A1  Sep. 20, 2007

(51) Int. Cl.
*H04K 1/10* (2006.01)
*H04B 1/00* (2006.01)

(52) U.S. Cl. .................... 375/355; 375/149
(58) Field of Classification Search .......... 375/355, 375/149, 343, 260, 364, 340; 370/503, 203; 455/101
See application file for complete search history.

(56) References Cited

U.S. PATENT DOCUMENTS

| | | | | |
|---|---|---|---|---|
| 5,349,567 | A * | 9/1994 | Reed | 367/100 |
| 7,058,151 | B1 * | 6/2006 | Kim | 375/355 |
| 2004/0052319 | A1 * | 3/2004 | Wakamatsu | 375/343 |
| 2004/0170237 | A1 * | 9/2004 | Chadha et al. | 375/343 |
| 2004/0190560 | A1 * | 9/2004 | Maltsev et al. | 370/503 |
| 2005/0100109 | A1 * | 5/2005 | Nagata et al. | 375/260 |
| 2006/0018413 | A1 * | 1/2006 | Gupta | 375/343 |
| 2006/0126670 | A1 * | 6/2006 | Jeon et al. | 370/503 |
| 2006/0133525 | A1 * | 6/2006 | Awad | 375/260 |
| 2007/0097946 | A1 * | 5/2007 | Mujtaba | 370/349 |
| 2007/0147552 | A1 * | 6/2007 | Olesen et al. | 375/343 |

OTHER PUBLICATIONS

Sridhar Nandula and K Giridhar, "Robust Timing Synchronization for OFDM Based Wireless LAN System", TENET, India, 2003 IEEE.*
Stuber et al, Broadband MIMO-OFDM Wireless Communications, Feb. 2004, IEEE.*
Satoshi Nagata, Noriyuki Maeda, Hiroyuki Atarashi and Mamoru Sawahashi, "Accurate FFT Processing Window Timing Detection Based on Maximum SIR Criterion in OFCDM Wireless Access", NTT DoCoMo, Japan, Aug. 30-Sep. 2, 2004, IEEE.*

(Continued)

*Primary Examiner*—Chieh M Fan
*Assistant Examiner*—Aristocratis Fotakis
(74) *Attorney, Agent, or Firm*—Buchanan Ingersoll & Rooney PC

(57) ABSTRACT

A frame timing synchronization technique for orthogonal frequency division multiplexing (OFDM) systems is presented. First, a coarse synchronization technique generates a coarse frame timing estimate. The coarse synchronization technique applies a sliding window differentiator to the output of a conventional auto-correlator to mitigate the plateau effect associated with conventional auto-correlation techniques. Second, a fine synchronization technique generates a fine frame timing estimate. The fine synchronization technique uses the coarse frame timing estimate to reduce the number of cross-correlation calculations. Additionally, the fine synchronization technique acquires a fine frame timing estimate based on a signal-to-interference ratio (SIR) metric, which is more robust to multi-paths and pseudo multi-paths caused by cyclic delay diversity (CDD) schemes than conventional cross-correlation synchronization techniques. A fine-tuning technique generates a desired frame timing estimate by searching a first signal path in a searching window around the fine frame timing estimate to further refine frame timing synchronization.

21 Claims, 11 Drawing Sheets

OTHER PUBLICATIONS

K.Wang, M.Faulkner, J.Singh and I.Tolochiko, "Timing Synchronization for 802.11a WLANs under Multipath Channels", 2003 Australian Telecommunications, Networks and Applications Conference (ATNAC), Sheraton Towers, Southbank, Melbourne, Dec. 8-10, 2003.*

Jongmin Cho, Huynh Trong Anh, Jinsang Kim, and Won-Kyung Cho, "Architecture of Timing Synchronization for MIMO-OFDM WLAN Systems", 2008 IEEE.*

Wen-Long Chin and Sau-Gee Chen, Symbol Time Synchronization Based on SINR Maximization for OFDM, National Chiao Tung University, Hsinchu, Taiwan, 2009 IEEE.*

Ying Tan, Scott Leyonhjem and Mike Faulkner, "Timing Synchronisation for OFDM-WLANs with Time Averaging Scheme", The Centre for Telecommunications and MicroElectronics Victoria University, Melbourne, Australia, May 2006, IEEE.*

Tiejun Lv, Hua Li, and Jie Chen, "Joint Estimation of Symbol Timing and Carrier Frequency Offset of OFDM Signals Over Fast Time-Varying Multipath Channels", Dec. 2005, IEEE.*

Aoki et al., "Backward Compatibility of CDD Preambles," IEEE 802.11-05/0006r0 (Jan. 2005).

Beek et al., "ML estimation of timing and frequency offset in OFDM Systems," IEEE Transactions on Signal Processing, vol. 45, No. 7, pp. 1800-1805 (Jul. 1997).

Chen et al., "OFDM Timing Synchronisation Under Multi-Path Channels," presented at IEEE Vehicular Technology Conference, Seoul, Korea, pp. 378-382 (Apr. 2003).

Enhanced Wireless Consortium (EWC) Proposed HT PHY Specification (Oct. 2005).

Kun-Wah Yip et al., "Timing Synchronization Analysis for IEEE 802.11a Wireless LANs in Frequency Nonselective Racian Fading Environments," IEEE Transactions on Wireless Communications, vol. 3, No. 2, pp. 387-394 (Mar. 2004).

S. A. Mujtaba, IEEE P802.11n TGn Sync Proposal Technical Specification, IEEE 802.11-04/0889r7 (Jul. 2005).

Schmidl et al., "Robust Frequency and Timing Synchronization for OFDM," IEEE Transactions on Communications, vol. 45, No. 12, pp. 1613-1621 (Dec. 1997).

S. H. Muller-Weinfurtner, "On the Optimality of Metrics for Coarse Frame Synchronization in OFDM: A Comparison," PIMRC '98, Boston, MA, pp. 533-537 (Sep. 1998).

* cited by examiner

FRAME TIMING SYNCHRONIZATION FOR ORTHOGONAL FREQUENCY DIVISION MULTIPLEXING (OFDM)

FIELD OF THE INVENTION

The present invention involves the field of signal processing. More particularly, the present invention involves techniques for frame timing synchronization for orthogonal frequency division multiplexing (OFDM).

DESCRIPTION OF THE RELATED ART

Different techniques for frame timing synchronization have been proposed. These schemes can be divided into two categories: auto-correlation based synchronization methods and cross-correlation based synchronization methods. Exemplary auto-correlation based synchronization methods are described in the following: Beek et al., "*ML estimation of timing and frequency offset in OFDM Systems,*" *IEEE Transactions on Signal Processing*, vol. 45, no. 7, pp. 1800-1805 (1997); Schmidl et al., "*Robust Frequency and Timing Synchronization for OFDM,*" *IEEE Transactions on Communications*, vol. 45, no. 12, pp. 1613-1621 (December 1997); and S. H. Muller-Weinfurtner, "*On The Optimality of Metrics for Coarse Frame Synchronization in OFDM: A Comparison,*" PIMRC '98, Boston, Mass., pp. 533-537 (September 1998). Exemplary cross-correlation based synchronization methods are described in Kun-Wah Yip et al., "*Timing Synchronization Analysis for IEEE 802.11a Wireless LANs in Frequency Nonselective Racian Fading Environments,*" IEEE Transactions on Wireless Communications, vol. 3, no. 2, pp. 387-394 (March 2004).

BACKGROUND OF THE INVENTION

OFDM is an effective modulation technique that can mitigate the effect of multi-paths, and has been widely adopted in wideband communication systems, such as 802.11a/g, HIPERLAN/2 and recent 802.11n proposals (e.g., *IEEE P802.11n TGn Sync Proposal Technical Specification*, IEEE 802.11-04/0889r7, July 2005, and *Enhanced Wireless Consortium (EWC) PHY Specification*, v 1.0, September 2005). A disadvantage of OFDM is sensitivity to synchronization errors. In order to facilitate synchronization at the receiver side, training symbols, which are called "preambles," are inserted at the beginning of each frame in most frame-oriented OFDM systems.

As described above, proposed schemes for frame timing synchronization can be divided into two categories: auto-correlation based synchronization techniques and cross-correlation based synchronization techniques. Auto-correlation based techniques exploit the repetition structure of preamble symbols or the guard intervals of data symbols to find the starting point of each frame. A well-known problem with conventional auto-correlation based techniques is a timing ambiguity caused by a plateau in the auto-correlator output signal, which will be described in more detail below.

Cross-correlation based techniques can be used to avoid the problems associated with conventional auto-correlation based techniques but, because the complexity of cross-correlation operations is much higher than that of auto-correlation operations, cross-correlation based techniques are limited to fine frame timing. Additionally, while conventional cross-correlation based techniques can work well in additive white Gaussian noise (AWGN) channels, these techniques may introduce some synchronization errors in multi-path channels, as will be described in more detail below.

What is needed, therefore, are robust techniques for frame timing synchronization that overcome the problems associated with conventional auto-correlation and cross-correlation based synchronization techniques.

BRIEF SUMMARY OF THE INVENTION

Robust techniques for frame timing synchronization that overcome the problems associated with conventional auto-correlation and cross-correlation based synchronization techniques are described herein.

In accordance with a first aspect of the present invention, a frame timing synchronization system includes a coarse frame timing synchronizer and a fine frame timing synchronizer. The coarse frame timing synchronizer includes an auto-correlator that generates an auto-correlator output signal based on a received signal and a sliding window differentiator that generates a sliding window differentiator signal based on the auto-correlator output signal. The coarse frame timing synchronizer detects a peak value of the sliding window differentiator signal and generates a coarse frame timing estimate based on a position of the peak value of the sliding window differentiator signal. The fine frame timing synchronizer includes a cross-correlator that generates a cross-correlator output signal based on a received signal, and a signal-to-interference ratio (SIR) metric calculator that generates a SIR metric signal based on the cross-correlator output signal. Optionally, the fine frame timing synchronizer includes a carrier frequency offset compensator that generates a received signal with carrier frequency offset compensation, such that the cross-correlator generates the cross-correlator output signal based on the received signal with carrier frequency offset compensation. The fine frame timing synchronizer performs the cross-correlation operations and SIR metric calculator operations in a small window around the coarse frame timing estimate. The fine frame timing synchronizer detects a peak value of the SIR metric signal and generates a fine frame timing estimate based on a position of the peak value of the SIR metric signal.

In accordance with a second aspect of the present invention, a coarse frame timing synchronization system includes an auto-correlator and a sliding window differentiator. The auto-correlator generates an auto-correlator output signal based on a received signal. The sliding window differentiator generates a differentiator signal by applying first and second moving average windows to the auto-correlator output signal and calculating a difference between first and second moving average window output signals. The coarse frame timing synchronizer generates a coarse frame timing estimate based on a position of a peak value of the differentiator signal.

In accordance with a third aspect of the present invention, a fine frame timing synchronization system includes a cross-correlator and a SIR metric calculator. The cross-correlator generates a cross-correlator output signal based on a received signal with carrier frequency offset compensation and a pilot signal. Optionally, the fine frame timing synchronizer includes a carrier frequency offset compensator that generates a received signal with carrier frequency offset compensation, such that the cross-correlator generates the cross-correlator output signal based on the received signal with carrier frequency offset compensation and the pilot signal. The SIR metric calculator generates a SIR metric signal based on the cross-correlator output signal. The fine frame timing synchronizer generates a fine frame timing estimate based on a position of the peak value of the SIR metric signal.

In accordance with a fourth aspect of the present invention, a frame timing synchronization method includes determining a coarse frame timing estimate and determining a fine frame timing estimate. The step of determining a coarse frame timing estimate includes generating a sliding window differentiator signal based on an auto-correlator output signal, and detecting a peak value of the sliding window differentiator signal. A position of the peak value of the sliding window differentiator signal corresponds to the coarse frame timing estimate. The step of determining a fine frame timing estimate includes generating a SIR metric signal based on a cross-correlator output signal and detecting a peak value of the SIR metric signal. The step of determining a fine frame timing estimate is performed in a small window around the coarse frame timing estimate. A position of the peak value of the SIR metric signal corresponds to the fine frame timing estimate.

In accordance with a fifth aspect of the present invention, a coarse frame timing synchronization method includes generating an auto-correlator output signal based on a received signal. The method further includes applying first and second moving average windows to the auto-correlator output signal to generate first and second moving average window output signals. The second moving average window is separated by a predetermined amount from the first moving average window. The method further includes calculating a difference between the first and second moving average window output signals, and determining a coarse frame timing estimate based on a position of a peak value of the calculated difference signal.

In accordance with a sixth aspect of the present invention, a fine frame timing synchronization method includes generating a cross-correlator output signal based on a received signal and a pilot signal, calculating a SIR metric signal based on the cross-correlator output signal, and detecting a peak value of the SIR metric signal. Optionally, the method includes generating a received signal with carrier frequency offset compensation, such that the cross-correlator output signal is based on the received signal with carrier frequency offset compensation and the pilot signal. The method further includes determining a fine frame timing estimate based on a position of the peak value of the SIR metric signal.

BRIEF DESCRIPTION OF THE DRAWING FIGURES

The objects and advantages of the present invention will be understood by reading the following detailed description in conjunction with the drawings in which.

DETAILED DESCRIPTION OF THE INVENTION

Overview

Frame timing synchronization techniques for orthogonal frequency division multiplexing (OFDM) based communications are presented that are designed to overcome the problems associated with conventional auto-correlation and cross-correlation based synchronization techniques. In one example, a coarse frame timing synchronization technique includes concatenating a sliding window differentiator with a conventional auto-correlation device to mitigate a timing ambiguity caused by a plateau in the auto-correlator output signal.

In another example, a fine frame timing synchronization technique includes defining a signal-to-interference ratio (SIR) metric to improve timing precision of a conventional cross-correlation device. As will be described in more detail below, compared to conventional cross-correlation synchronization techniques, this fine frame timing synchronization technique is more robust to multi-paths or pseudo multi-paths caused by use of the cyclic delay diversity (CDD) scheme, which may be adopted in future wireless communication systems (e.g., wireless LAN 802.11n).

A discussion of synchronization for OFDM communications is presented below, followed by a detailed description of exemplary systems and methods for frame timing synchronization for OFDM communications.

Synchronization for OFDM Communications

Figure 1:
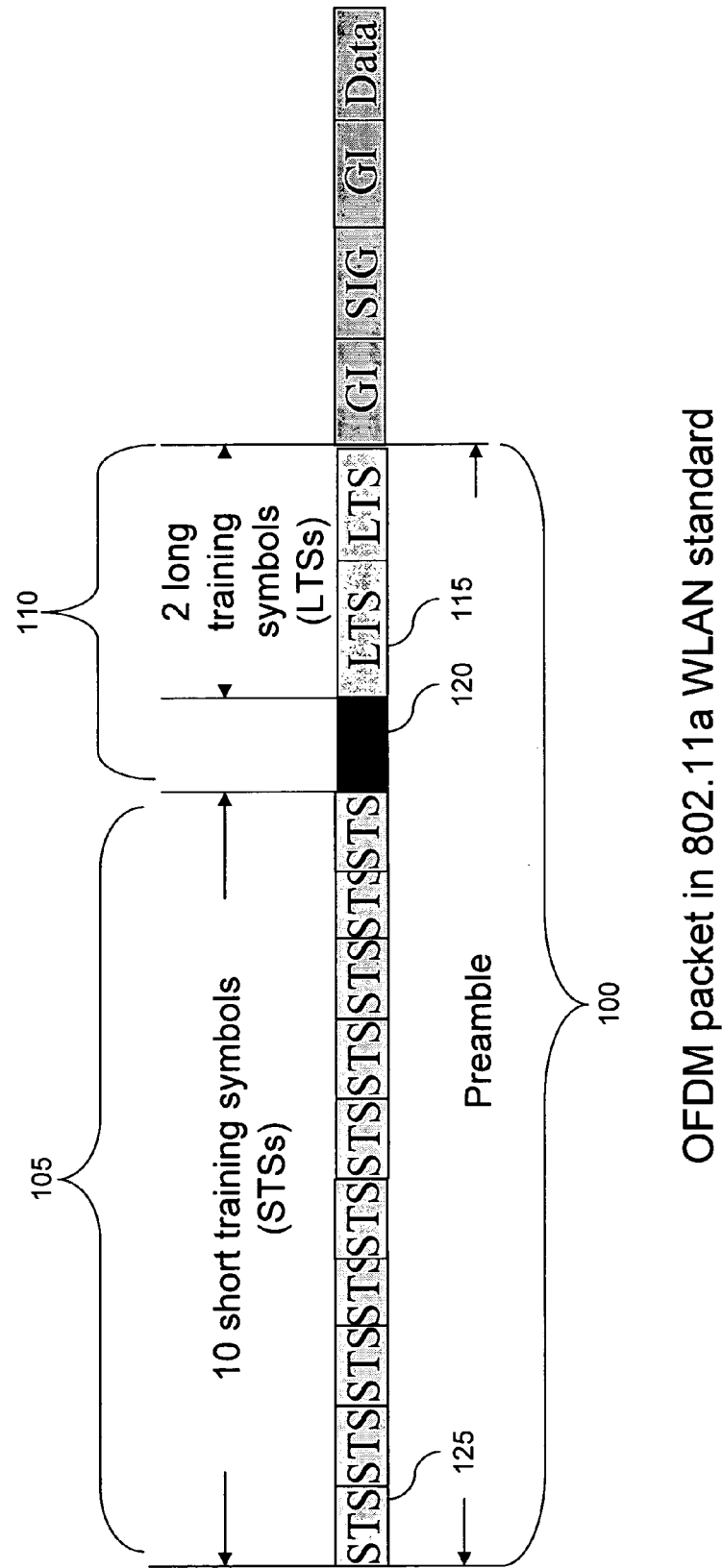
FIG. 1 illustrates an exemplary preamble structure of an orthogonal frequency division multiplexing (OFDM) packet in accordance with the 802.11a WLAN standard.

OFDM is an effective modulation technique that can mitigate the effect of multi-paths and has been widely adopted in wideband communication systems, such as 802.11a/g, HIPERLAN/2, and recent 802.11n proposals. A problem with OFDM, however, is sensitivity to synchronization errors. In order to facilitate synchronization at the receiver side, training symbols called "preambles" are inserted at the beginning of each frame in most frame-oriented OFDM systems. Known training symbol samples, referred to as "pilot signals," can be used to estimate the characteristics of the communications channel. Systems that employ pilot signals to estimate channel characteristics are referred to as "pilot-aided" systems. FIG. 1 illustrates an exemplary preamble structure 100 of an OFDM packet in accordance with the 802.11a WLAN standard. Preamble structure 100 includes two parts. A first part 105 includes ten identical short training symbols (STSs) 125, and a second part 110 includes two identical long training symbols (LTSs) 115 and a guard interval (GI) 120.

Frame timing synchronization is critical to the reliable decoding of data at the receiver side. Typically, a timing reference is acquired so that the start point of a transmission frame can be detected. Then, the Fast Fourier Transform (FFT) window position for each OFDM symbol can be fixed and the data can be demodulated. If incorrect frame timing is acquired, the system performance may be degraded greatly due to the inter-symbol interference (ISI) and inter-carrier interference (ICI) introduced by the incorrect FFT window timing.

As described above, proposed schemes for frame timing synchronization can be divided into two categories: auto-correlation based synchronization techniques and cross-correlation based synchronization techniques. Auto-correlation based techniques exploit the repetition structure of preamble symbols, such as STSs 125 and LTSs 115 shown in FIG. 1, or guard intervals of data symbols, to find a starting point of each frame.

A maximum-likelihood (ML) auto-correlation synchronization algorithm is an exemplary auto-correlation based synchronization technique. For example, if the auto-correlation is based on STSs, the following operations (1)-(5) can be performed to find a timing reference $\hat{\tau}$, where r(t) denotes a received signal at time t, M is the length of a STS, L is the average window length, and SNR denotes the average signal-to-noise ratio at the receiver side.

$$\hat{\tau} = \operatorname{argmax}(\Lambda_a(\tau)) \quad (1)$$

$$\Lambda_a(\tau) = |\gamma(\tau)| - \rho\phi(\tau) \quad (2)$$

$$\gamma(\tau) = \sum_{k=0}^{L-1} r(\tau - k) r*(\tau - M - k) \quad (3)$$

$$\phi(\tau) = 1/2 \sum_{k=0}^{L-1} \{|r(\tau-k)|^2 + |r(\tau - M - k)|^2\} \quad (4)$$

$$\rho = \frac{SNR}{(SNR+1)} \quad (5)$$

Figure 2:
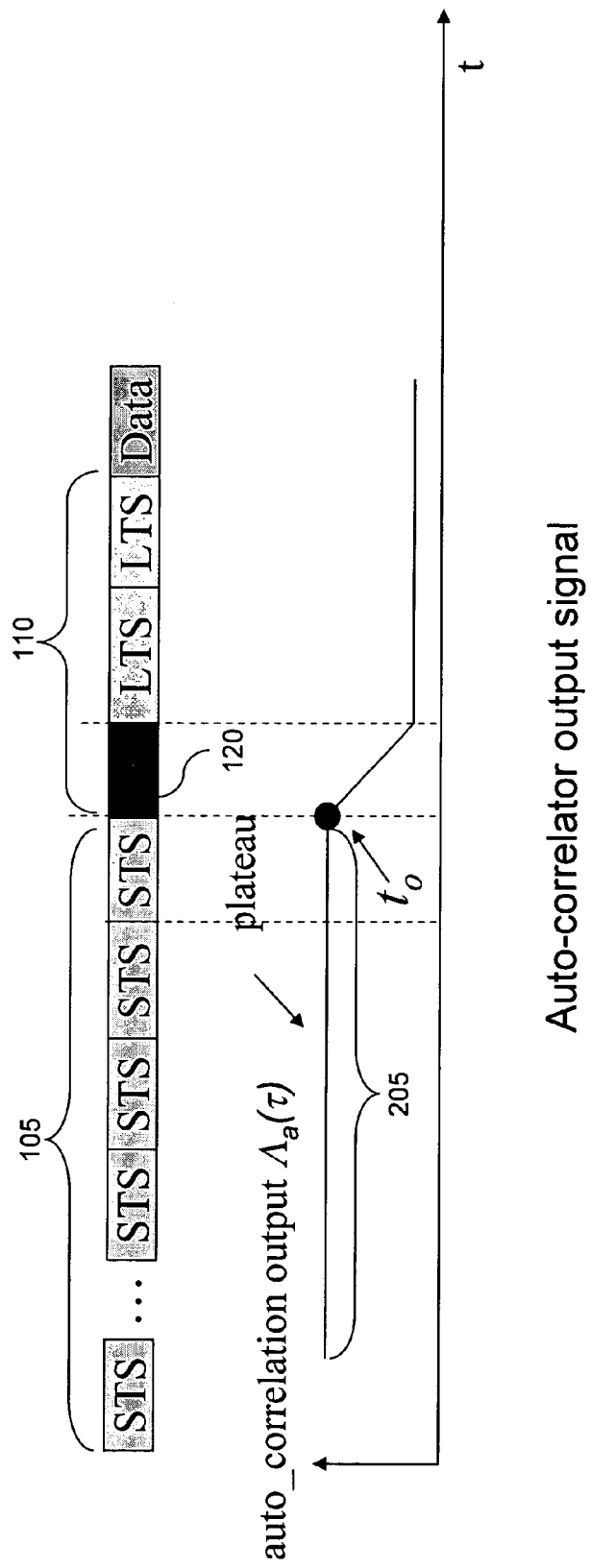
FIG. 2 illustrates an exemplary auto-correlator output function for synchronization based on the repetition structure of short training symbols (STSs)

As described above, there is a well-known metric plateau problem associated with auto-correlation synchronization techniques. For example, FIG. 2 illustrates the auto-correlator output signal $\Lambda_a(\tau)$, as defined in equation (2) above, for synchronization based on the repetition structure of STSs. The desired timing is $t_o$, which is the beginning time of the LTS GI 120. Based on time $t_o$, the receiver can acquire the correct FFT window position for each OFDM symbol. However, due to the channel noise, the peak of $\kappa_a(\tau)$ can appear at any point on a plateau 205. Thus, the timing variance of the auto-correlation synchronization technique illustrated in FIG. 2 is very large and it may degrade performance greatly. Accordingly, such auto-correlation synchronization techniques are typically only used to achieve coarse frame timing synchronization.

To avoid the problems associated with conventional auto-correlation synchronization techniques, cross-correlation synchronization techniques can be implemented. Conventional cross-correlation frame timing synchronizers use the good auto-correlation property of preamble training symbols (e.g., STSs or LTSs) to acquire frame timing, and calculate the cross-correlation between a known training symbol (e.g., STS or LTS) and a received signal with carrier frequency offset compensation r(k). The peak of the cross-correlation output signal is detected to determine the frame timing information. The cross-correlation operation can be described as follows:

$$\hat{\tau} = \operatorname*{argmax}_{\tau}(\Lambda_c(\tau)) \quad (6)$$

$$\Lambda_c(\tau) = \left| \sum_{k=0}^{L-1} r(k+\tau) s^*(k) \right| \quad (7)$$

In equation (7), s(k) represents known STS or LTS samples and L denotes the length of a known training symbol (e.g., STS or LTS). Since STSs and LTSs have good auto-correlation properties, this cross-correlation technique can provide a precise frame timing estimation. However, such cross-correlation techniques are typically only used to achieve fine frame timing because the complexity of the cross-correlation operations is much higher than that of conventional auto-correlation operations.

Additionally, while cross-correlation methods can work well under AWGN channels, they may not perform well in multi-path channels. For example, in multi-path channels, the cross-correlation operation may synchronize to the strongest signal path, which may not be the first signal path, potentially introducing synchronization errors.

Figure 3:
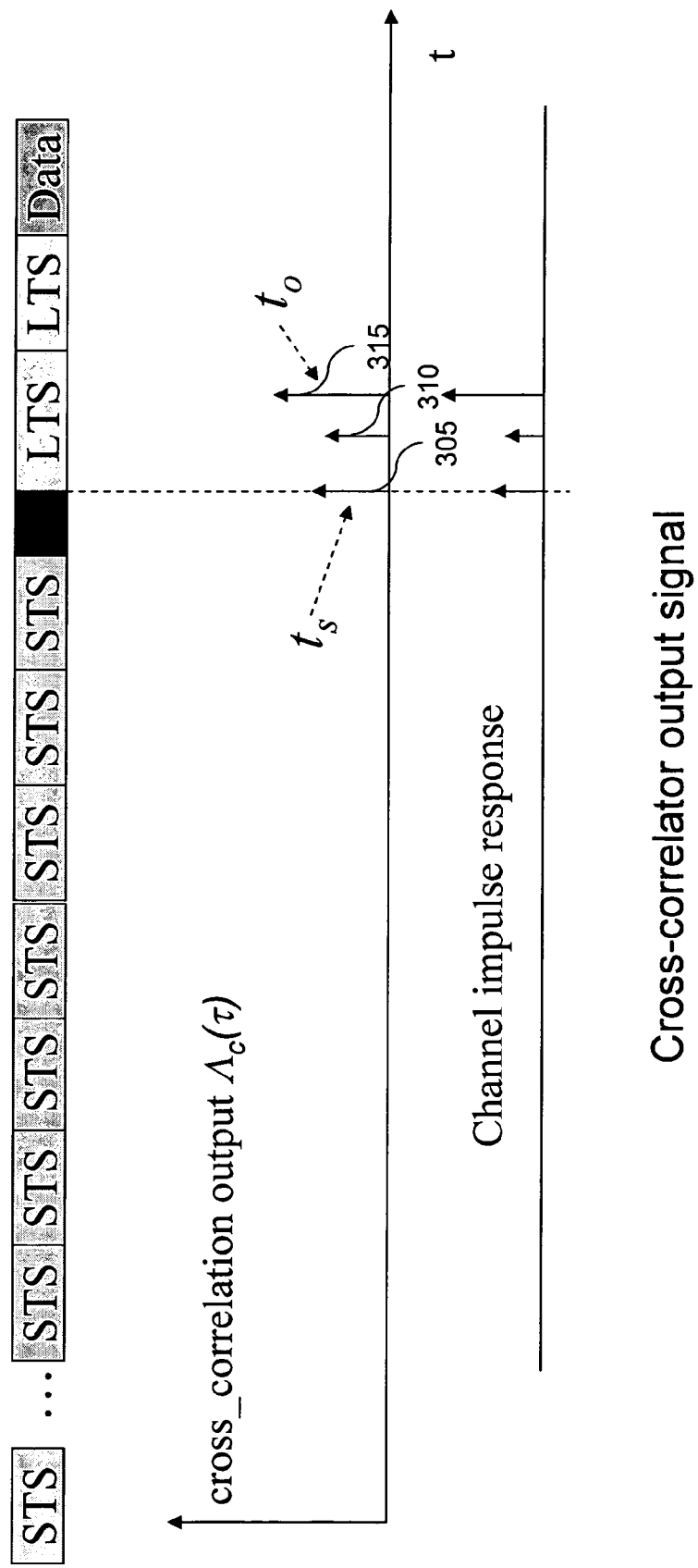
FIG. 3 illustrates an exemplary cross-correlator output function.

For example, FIG. 3 illustrates the cross-correlator output signal based on the cross-correlation timing metric function $\Lambda_c(\tau)$, as defined in equation (7) above. FIG. 3 shows the channel impulse response for first, second, and third signal paths 305, 310, and 315, respectively. Due to multi-paths, the cross-correlation synchronizer may synchronize to time $t_o$, which corresponds to third signal path 315, instead of to the correct time $t_s$, which corresponds to first signal path 305. By synchronizing to $t_o$, a timing error of $t_o$-$t_s$ is introduced. This kind of error can usually be tolerated because the time offset between the first signal path and the strongest signal path is typically small enough such that ISI and ICI can be avoided by deliberately moving forward the frame timing start point with a small offset.

Furthermore, the cyclic delay diversity (CDD) scheme has been proposed for multiple antenna OFDM systems (usually referred to as "MIMO-OFDM") in recent 802.11n wireless LAN proposals. In the CDD scheme, the transmitted signal from each antenna is the cyclic delayed version of the original modulated signal, and the received signal is the sum of the transmitted signals from all of the transmit antennas plus noise. CDD can provide some spatial diversity, which makes the system more robust to the fading effect, however, to the receiver, CDD also introduces pseudo multi-paths and can cause cross-correlation synchronizers to fail.

Figure 4:
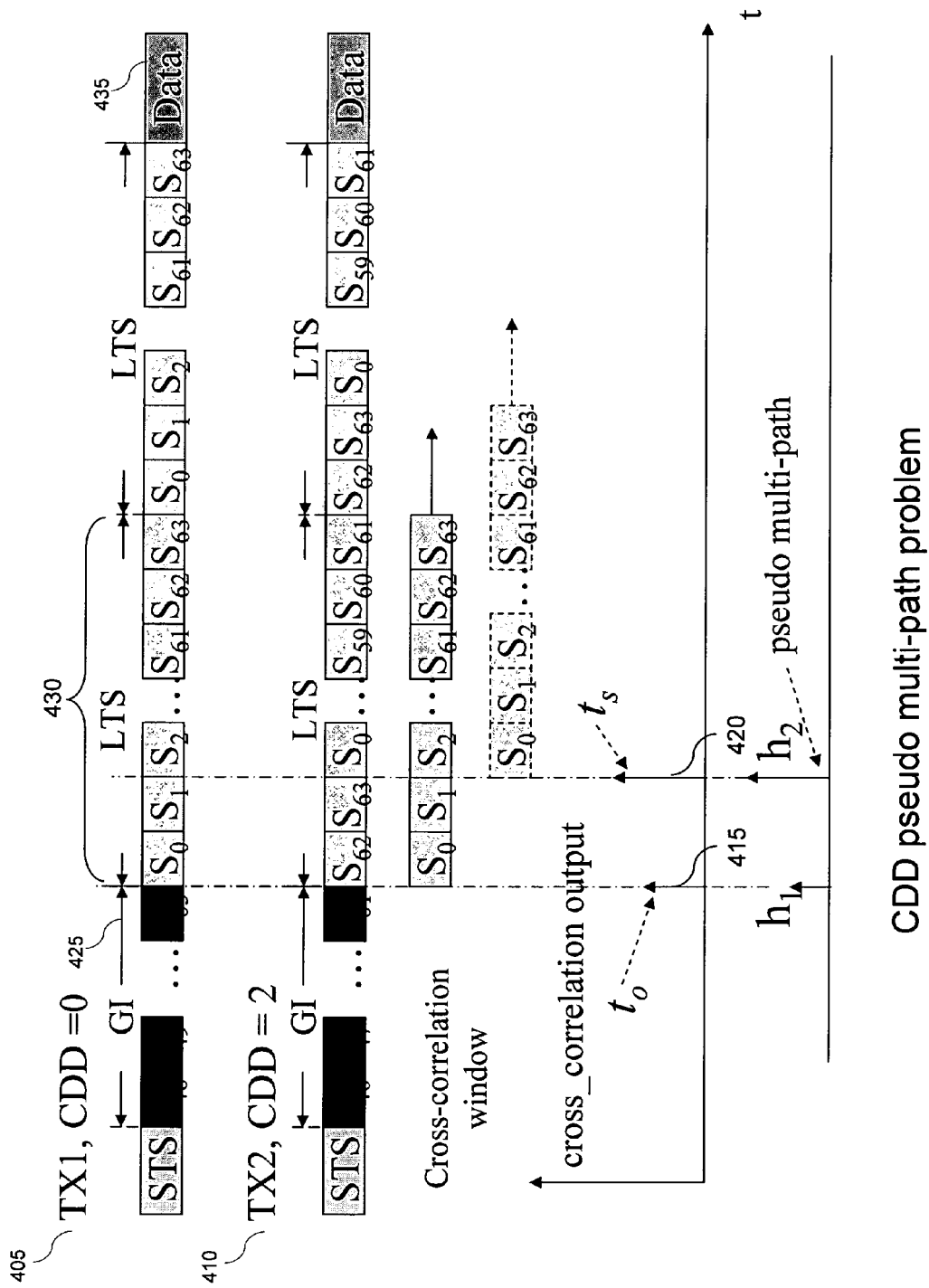
FIG. 4 illustrates an exemplary implementation of cyclic delay diversity (CDD) for two transmit antennas resulting in a pseudo multi-path problem at the receiver side.

FIG. 4 illustrates an exemplary implementation of CDD for two transmit antennas resulting in a pseudo multi-path problem at the receiver side. In the example of FIG. 4, a first transmit antenna 405 (TX1) has a CDD value of 0, which means a transmit signal x(k) is defined as x(k)=S(k), while a second transmit antenna 410 (TX2) has a positive CDD value of 2, which means the transmit signal x(t) is defined as S((k+2)$_{mod\ 64}$). S(k) represents known LTS time domain samples.

At the receiver side, as the cross-correlation window moves toward the right side of FIG. 4, it will generate at least two peaks. A first peak 415, which is caused by signals transmitted from transmit antenna 405 (TX1), is at time $t_o$. A second peak 420, which is caused by signals transmitted from transmit antenna 410 (TX2), is at time $t_s$. The receiver views signals from transmit antenna 410 (TX2) as the signals transmitted from transmit antenna 405 (TX1) but through a different path having a delay of 2 and channel gain of $h_2$. In this case, pseudo multi-paths result. When the channel gain of transmit antenna 410 (TX2) h2 is larger than the channel gain of transmit antenna 405 (TX1) h1, second peak 420 is bigger than first peak 415, and the cross-correlation synchronizer will synchronize to time $t_s$ instead of to the correct time $t_o$.

In typical CDD implementations, the CDD value is large and the synchronization error illustrated in FIG. 4 will introduce significant interference and cause the data symbol detection to fail. This synchronization problem associated with the CDD scheme is described in Aoki et al., "*Backward compatibility of CDD preambles*," IEEE 802.11-05/0006r0, January 2005, which also noted that auto-correlation synchronizers are more robust to both real and pseudo multi-paths. A detailed description of exemplary frame timing synchronization systems and methods for OFDM follows that are designed to mitigate the problems described above associated with conventional auto-correlation and cross-correlation based synchronization techniques.

Exemplary Frame Timing Synchronization Systems for OFDM

In this section, a frame timing synchronization system is presented that mitigates the problems associated with conventional auto-correlation and cross-correlation synchronization techniques discussed in the previous section. First, a sliding window differentiator is derived and applied after a conventional auto-correlation device to achieve coarse frame timing synchronization. This coarse frame timing synchronizer mitigates the plateau problem associated with conventional auto-correlation devices, thereby improving precision. Next, a signal-to-interference ratio (SIR) metric is defined and applied after a conventional cross-correlation device to achieve fine frame timing synchronization. This fine frame timing synchronizer includes a SIR metric calculator that performs peak detection based on the SIR metric signal instead of the output of the cross-correlation device to mitigate the pseudo multi-path problem associated with the CDD scheme. Finally, a search operator searches a first signal path in a window around the frame timing estimation from the fine frame timing synchronizer to further improve the frame timing precision of the system.

Figure 5:
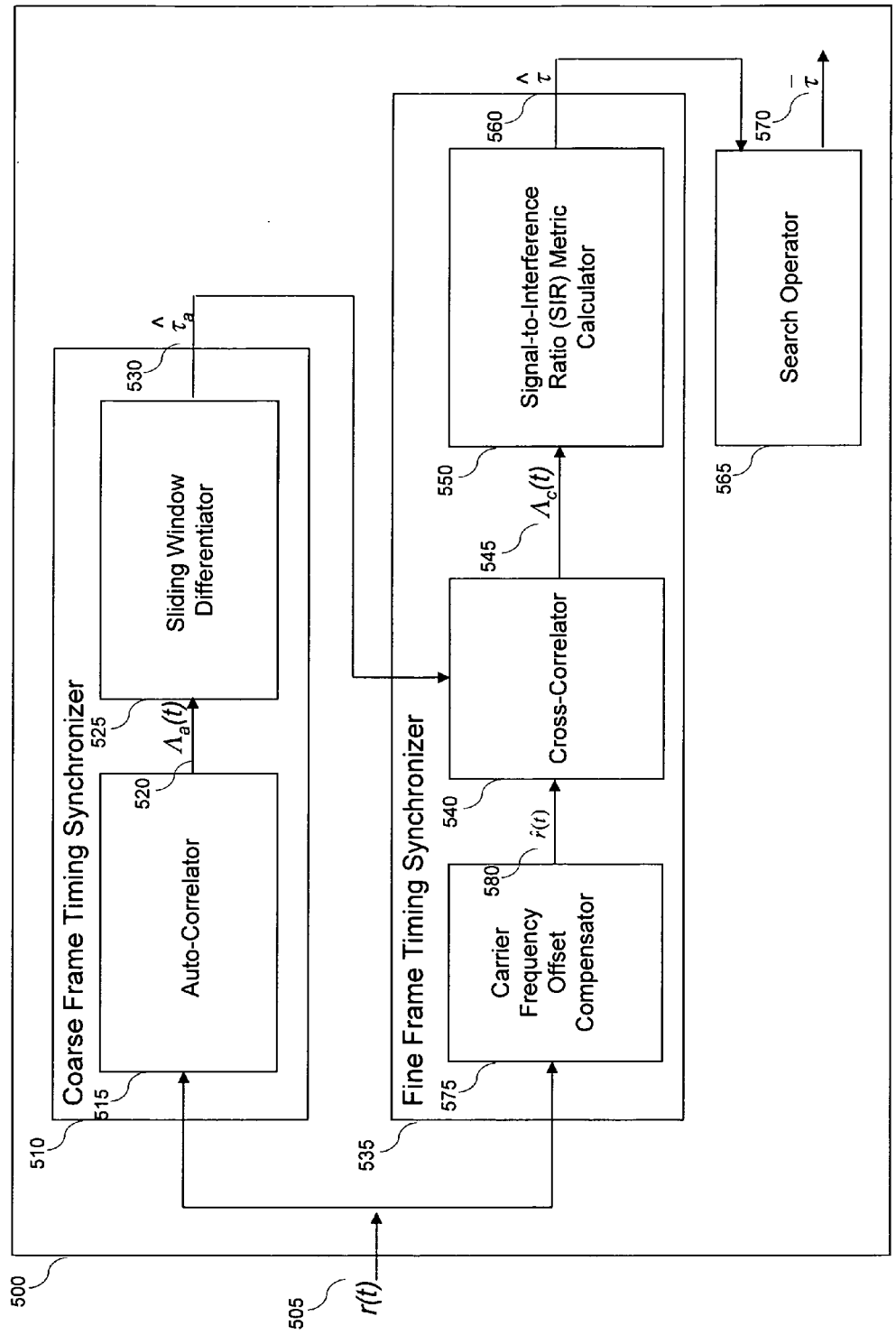
FIG. 5 illustrates a system for frame timing synchronization in accordance with an exemplary embodiment of the present invention.

FIG. 5 illustrates a system 500 for frame timing synchronization, in accordance with an exemplary embodiment of the present invention. System 500 includes a coarse frame timing synchronizer 510, a fine frame timing synchronizer 535, and a search operator 565.

As shown in FIG. 5, coarse frame timing synchronizer 510 includes an auto-correlator 515 and a sliding window differentiator 525. Auto-correlator 515 generates an auto-correlator output signal $\Lambda_a(t)$ 520 based on a received signal r(t) 505, and sliding window differentiator 525 generates a coarse frame timing synchronization estimate $\hat{\tau}_a$ 530 based on auto-correlator output signal $\Lambda_a(t)$ 520. As described above in conjunction with FIG. 2, there is a well-known metric plateau problem associated with conventional auto-correlation synchronizers. Advantageously, sliding window differentiator 525 is designed to mitigate this plateau problem.

Figure 6:
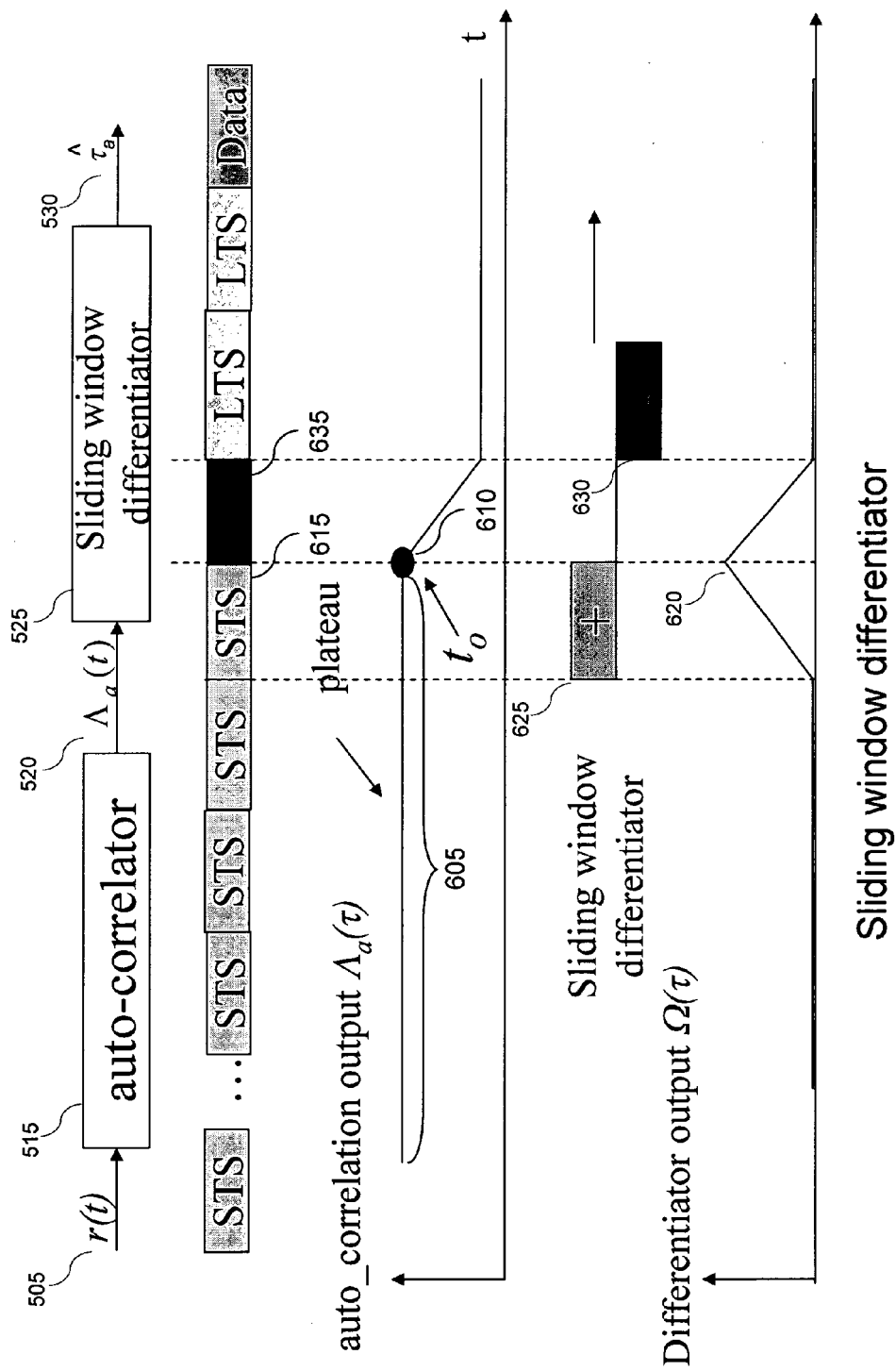
FIG. 6 illustrates a sliding window differentiator operation in accordance with an exemplary embodiment of the present invention.

FIG. 6 illustrates a sliding window differentiator operation in accordance with an exemplary embodiment of the present invention. Shown in FIG. 6 is auto-correlator 515, which generates auto-correlator output signal $\Lambda_a(t)$ 520 based on received signal r(t) 505, and sliding window differentiator 525, which generates coarse frame timing synchronization estimate $\hat{\tau}_a$ 530 based on auto-correlator output signal $\Lambda_a(t)$ 520. Due to channel noise, the peak of $\Lambda_a(t)$ can appear at any point on a plateau 605 instead of at a desired position $t_o$ 610. Thus, the timing variance of auto-correlator 515 is very large, potentially greatly degrading performance.

One purpose of sliding window differentiator 525 is to remove plateau 605. Sliding window differentiator 525 is implemented as two moving average windows 625 and 630, which are separated by a predetermined amount M. In one embodiment, the moving average windows are separated by a length of a training symbol (e.g., the length of STS 615), or the length of a guard interval (e.g., the length of GI 635). The moving average operation is used to suppress the noise. The outputs of moving average windows are subtracted to generate a peak 620 at desired position $t_o$ 610. The sliding window differentiator operation is defined as follows:

$$\hat{\tau}_a = \underset{\tau}{\operatorname{argmax}}(\Omega(\tau)) \quad (8)$$

$$\Omega(\tau) = \sum_{k=0}^{L_1-1} \Lambda_a(\tau - k) - \sum_{k=0}^{L_2-1} \Lambda_a(\tau + M + k) \quad (9)$$

Because the moving average window operation can be implemented in a recursive way, the complexity is low. Additionally, output peak 620 is unique and the variance of the estimated timing $\hat{\tau}_a$ 530 is greatly reduced. In real system implementations, such as an 802.11a/g system, the samples of the STSs have the same energy, and the signal-to-noise ratio (SNR) is usually high enough, such that the auto-correlation operation can be simplified as follows:

$$\Lambda_a(\tau) = |\gamma(\tau)| \quad (10)$$

$$\gamma(\tau) = \sum_{k=0}^{L-1} r(k-\tau)r^*(k-M-\tau) \quad (11)$$

When there are N receive antennas in the system, the auto-correlation operation can be represented as follows:

$$\Lambda_a(\tau) = \left|\sum_{i=1}^{N} \gamma_i(\tau)\right| \quad (12)$$

$$\gamma_i(\tau) = \sum_{k=0}^{L-1} r_i(k-\tau)r_i^*(k-M-\tau) \quad (13)$$

where $\gamma_i(k)$ is the received signal of the $i^{th}$ receive antenna at time k.

System 500, shown in FIG. 5, includes fine frame timing synchronizer 535 to refine coarse frame timing estimate $\hat{\tau}_a$ 530 output from coarse frame timing synchronizer 510. Fine frame timing synchronizer 535 includes carrier frequency offset compensator 575, which compensates carrier frequency offset in received signal r(t) 505 and outputs a received signal with carrier frequency offset compensation $\hat{r}(t)$ 580. Fine frame timing synchronizer 535 further includes cross-correlator 540, which generates a cross-correlator output signal $\Lambda_c(t)$ 545 from received signal with carrier frequency offset compensation $\hat{r}(t)$ 580 and known LTS or STS samples in accordance with equation (7) above. Fine frame timing synchronizer 535 also includes SIR metric calculator 550, which generates a fine frame timing estimate $\hat{\tau}$ 560 based on cross-correlator output signal $\Lambda_c(t)$ 545.

As described above in conjunction with FIG. 4, the CDD scheme introduces pseudo multi-paths, which can cause conventional cross-correlation synchronizers to fail. Advantageously, SIR metric calculator 550 is designed to mitigate error caused by pseudo multi-paths.

Fine frame timing synchronizer 535 operates as follows. First, assume positive CDD values so that all of the pseudo multi-paths caused by the CDD scheme are behind the real channel paths. For example, as shown in FIG. 4, multi-path signal $h_2$ at time $t_s$ 420 is behind first path signal $h_1$ at time $t_o$ 415. Fine frame timing synchronizer 535 needs to find the first path signal $h_1$ at time $t_o$ 415. In one embodiment, the fine frame timing synchronization approach implemented by fine frame timing synchronizer 535 is based on a cross-correlation operation with LTS. After frequency offset compensation, a compensated received signal is input to a LTS cross-correlation synchronizer. For example, as shown in FIG. 5, received signal with carrier frequency offset compensation $\hat{r}(t)$ 580 is input into cross-correlator 540. As further shown in FIG. 5, fine frame timing synchronizer 535 does not execute peak detection directly at the output of cross-correlator 540. Instead, fine frame timing synchronizer 535 executes peak detection at the output of SIR metric calculator 550, which is concatenated to cross-correlator 540.

SIR metric calculator 550 calculates a SIR metric signal $\Psi(r)$, which is defined as follows:

$$\Psi(\tau) = \sum_{i=0}^{L_3-1} \Lambda_c^2(\tau+i) \bigg/ \sum_{i=1}^{L_4} i\Lambda_c^2(\tau-i) \qquad (14)$$

The numerator term represents the signal energy collected in a signal energy window $W_e=[\tau, \tau+L_3-1]$, which has a length of $L_3$. The denominator term represents the interference energy caused by the multi-paths in an interference window $W_i=[\tau-L_4, \tau-1]$, which has a length of $L_4$. The signal paths in window $W_i$ will cause ICI and ISI if the current position is chosen. This interference caused by the path at position $\tau-i$ can be approximated by Gaussian noise with power that is proportional to $i\Lambda^2_c(\tau-i)$. The signal energy window length $L_3$ and the interference window length $L_4$ can be optimized to achieve the best performance.

The SIR metric can be simplified in an ad hoc way as follows:

$$\Psi(\tau) = \sum_{i=0}^{L_3-1} \Lambda_c^2(\tau+i) - \varpi \sum_{i=1}^{L_4} \Lambda_c^2(\tau-i) \qquad (15)$$

where $\overline{\omega}$ is a weight parameter. Because LTS has a good auto-correlation property, the cross-correlation output in the GI region is very small (e.g., see GI region 425 in FIG. 4). At the real starting point of the first LTS (e.g., see LTS 430 in FIG. 4), the interference window will fall into the GI region, which means that the collected interference energy will be very small. Additionally, the signal energy window will cover almost all of the strongest real multi-paths, which means that the collected signal energy will be very large. Thus, the output of the SIR metric calculator achieves a maximum at the correct frame timing (i.e., at the real starting point of the first LTS).

When the interference and signal windows move toward the data field on the right side (e.g., see data field 435 in FIG. 4), some real multi-paths and pseudo paths will fall into the interference windows, causing the SIR metric calculator output to decrease. Accordingly, by detecting the peak of the SIR metric calculator output, the correct frame timing, which, in an embodiment, corresponds to the starting point of the first LTS, can be acquired. The peak detection operation performed by SIR metric calculator 550 can be defined as follows:

$$\hat{\tau} = \underset{\tau \in W_a}{\mathrm{argmax}}(\Psi(\tau)) \qquad (16)$$

where $W_a$ is a searching window around the estimated starting time position of the first LTS, which is calculated based on coarse frame timing estimate $\hat{\tau}_a$ 530 output from coarse frame timing synchronizer 510. The size of window $W_a$ is adjustable to reduce the total amount of cross-correlation operations performed.

When there are N receive antennas at the receiver side, the SIR metric function can be defined as follows:

$$\Lambda_c^2(\tau) = \sum_{i=1}^{N} \left| \sum_{k=0}^{L-1} r_i(k+\tau)s^*(k) \right|^2 \qquad (17)$$

This operation resembles a maximum ratio combining (MRC) technique to improve system performance.

In the case of negative CDD values, all of the pseudo multi-paths caused by the CDD scheme are ahead of the real channel paths. In this case, the definition of the SIR metric is revised as follows:

$$\Psi(\tau) = \sum_{i=0}^{L_3-1} \Lambda_c^2(\tau+i) - \varpi \sum_{i=0}^{L_4-1} \Lambda_c^2(\tau+B+i) \qquad (18)$$

where B is a positive shift. Thus, the only difference from the case of positive CDD values described above in conjunction with equation (15) is that the interference window $W_i$ is shifted behind the signal energy window $W_e$.

Due to the summation operation in the SIR metric calculation, shown above in equations (14), (16), and (18), the fine frame timing estimate $\hat{\tau}$ 560 may vary slightly around the correct position. In order to further improve frame timing precision, system 500 optionally includes a search operator 565, as shown in FIG. 5. Search operator 565 will search the first real path in a searching window defined as $[\hat{\tau}-L_5, \hat{\tau}]$, where $\hat{\tau}$ is the fine frame timing estimate 560 generated by fine frame timing synchronizer 535, and output a desired timing estimate $\overline{\tau}$ 570. The search operation is defined as follows:

$$\overline{\tau} = \underset{\tau \in [\hat{\tau}-L_5, \hat{\tau}]}{\mathrm{argmin}} \{\tau \mid \Lambda_c(\tau) > \alpha \Lambda_c^{max}\}, \qquad (19)$$

$$\Lambda_c^{max} = \underset{\tau \in [\hat{\tau}-L_5, \hat{\tau}]}{\mathrm{argmin}} \{\Lambda_c(\tau)\}$$

where $\alpha$ is a threshold parameter. Additionally, desired timing estimate $\overline{\tau}$ 570 may be moved forward deliberately to make it more robust to the timing error.

Exemplary Frame Timing Synchronization Methods for OFDM

FIGS. 7-11 are flowcharts providing exemplary steps for a method for frame timing synchronization for OFDM in accordance with exemplary embodiments of the present invention. The steps of FIGS. 7-11 do not necessarily have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

It should be noted that in accordance with an embodiment of the present invention, the methods illustrated in FIGS. 7-11 can be employed in conjunction with a computer-based system, where the method can be implemented in hardware, software, firmware, or combinations thereof.

Figure 7:
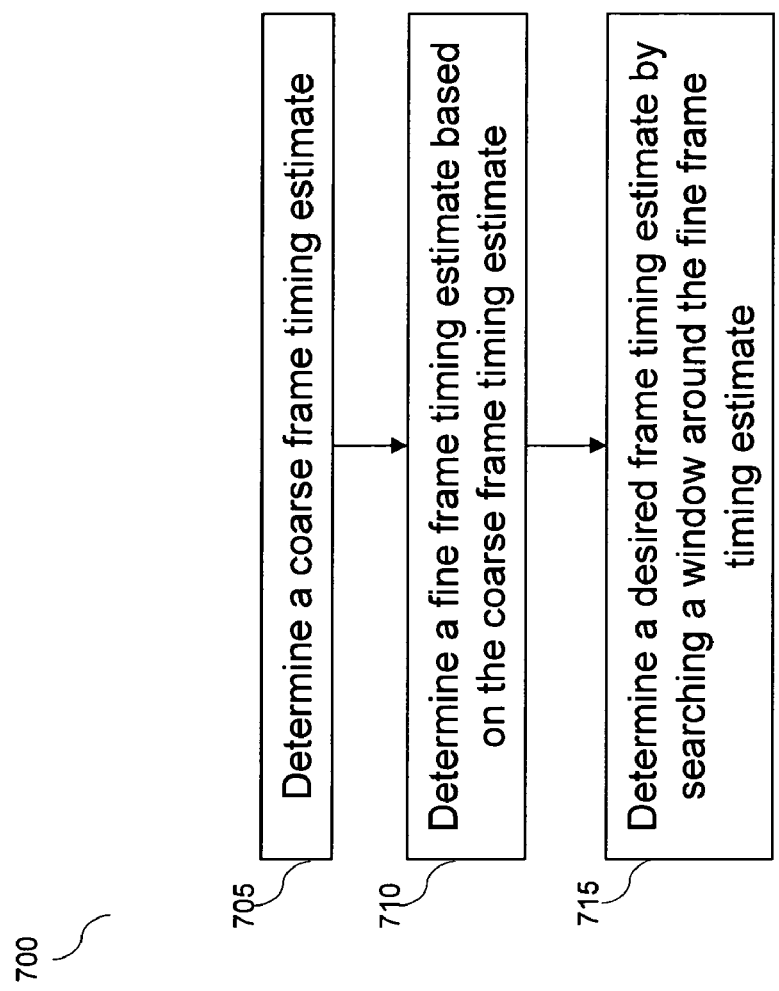
FIGS. 7-11 are flowcharts providing exemplary steps for frame timing synchronization in accordance with exemplary embodiments of the present invention.
Figure 8:
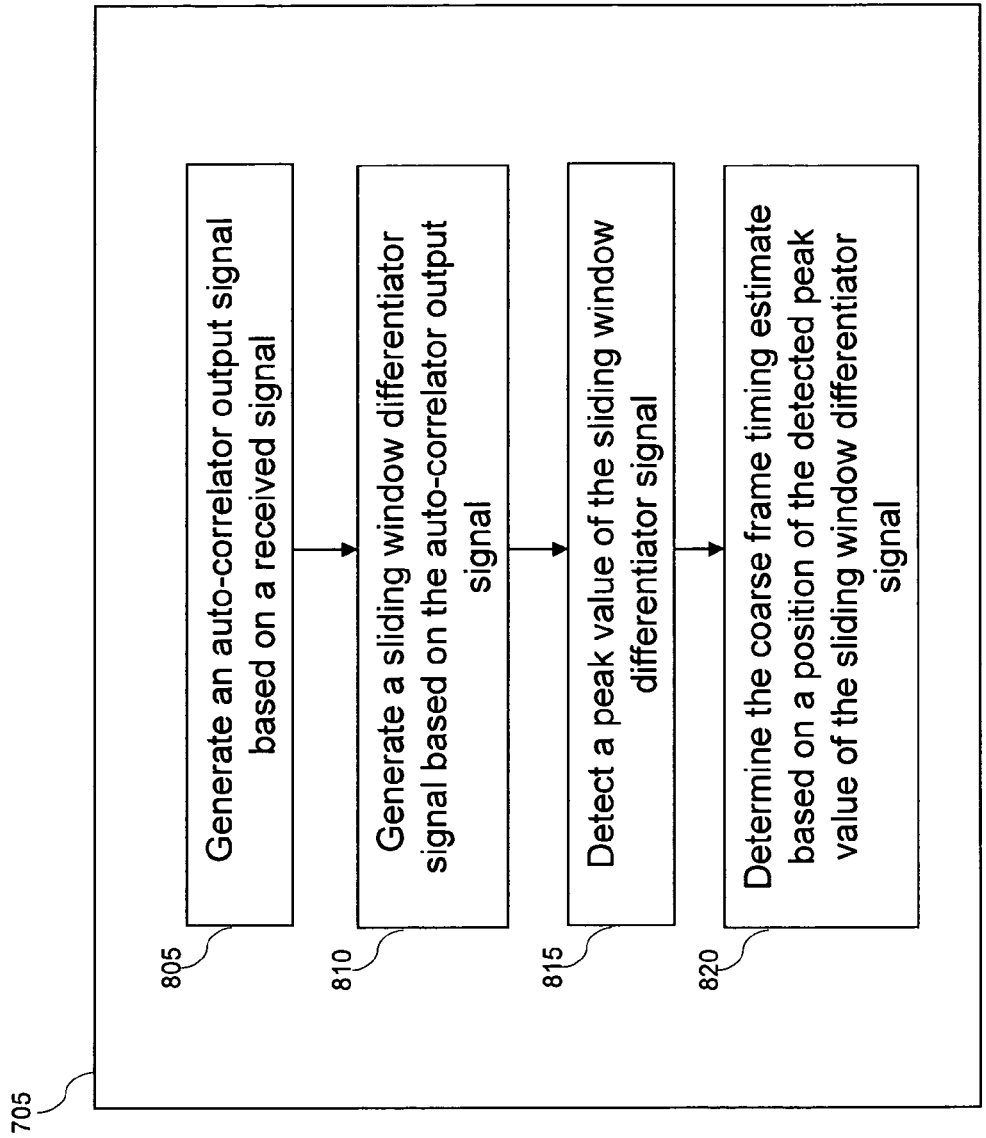
Figure 9:
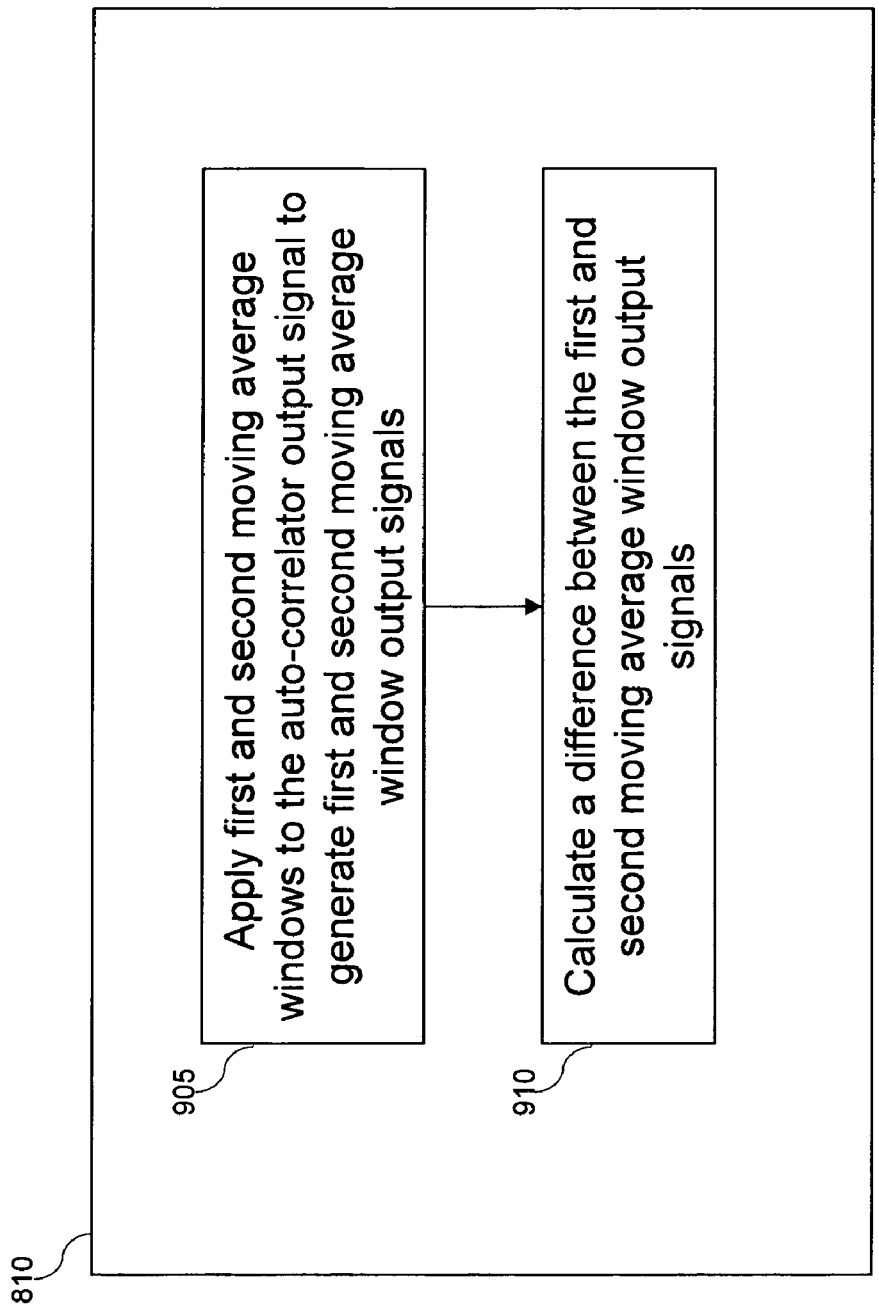
Figure 10:
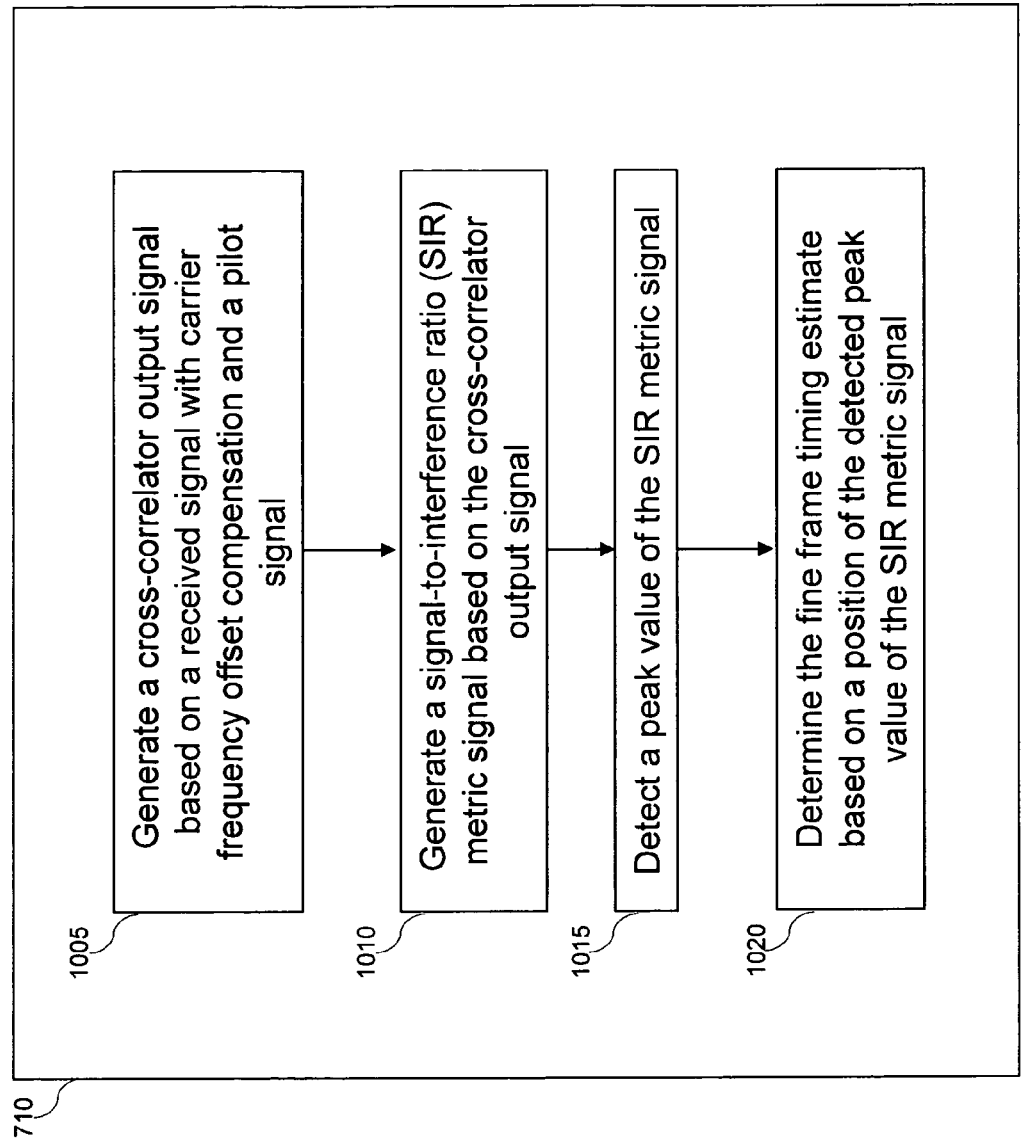
Figure 11:
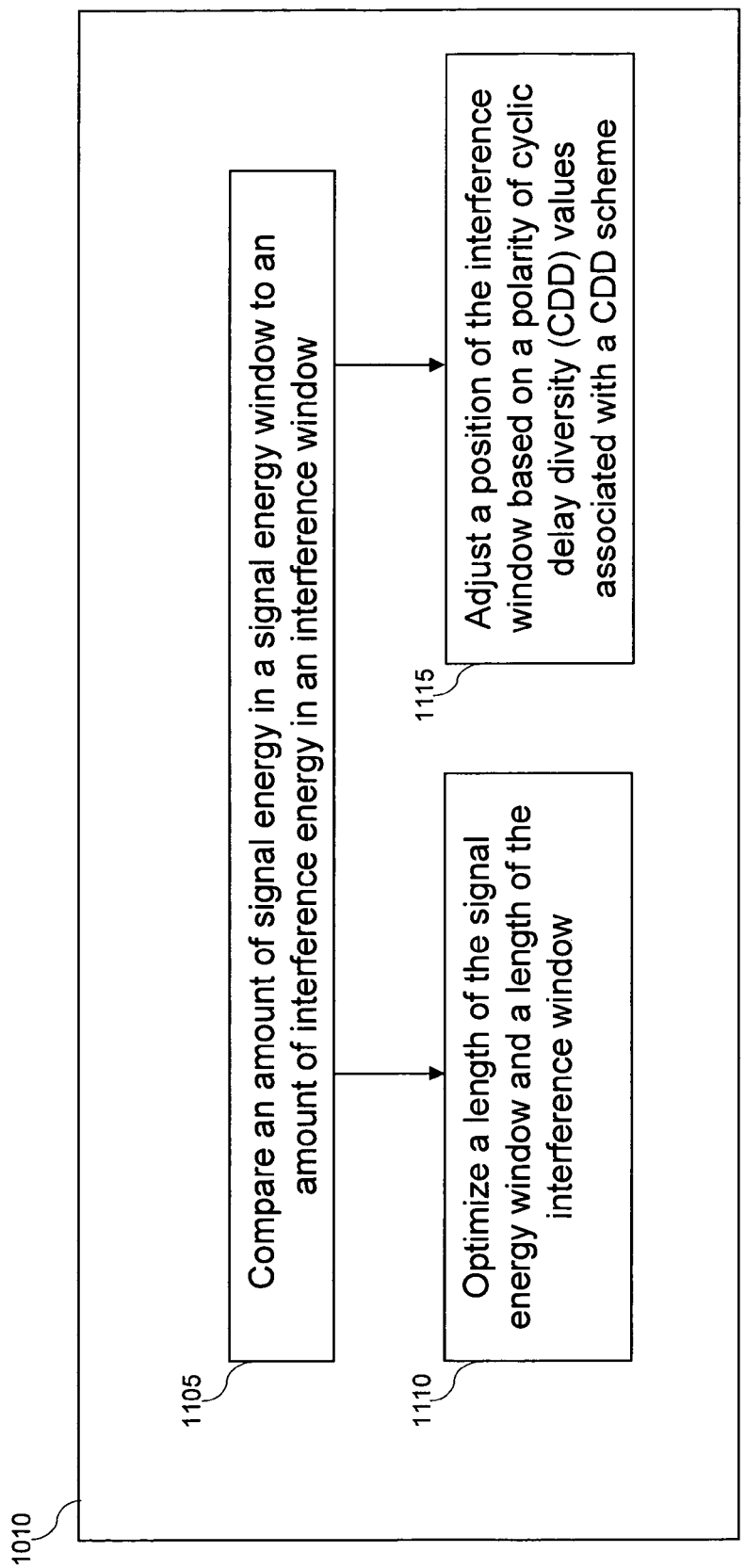

FIG. 7 is a flowchart providing exemplary steps for a method 700 for frame timing synchronization in accordance with an exemplary embodiment of the present invention. Method 700 includes three steps for determining a frame timing estimate. In step 705, a coarse frame timing estimate is determined. FIGS. 8 and 9 provide exemplary steps for implementing step 705 and are described in detail below. In step 710, a fine frame timing estimate is determined based on the coarse frame timing estimate generated in step 705. Due to the high complexity of the fine frame timing estimate operations, these operations are only performed in a small window around the coarse frame timing estimate. FIGS. 10 and 11 provide exemplary steps for implementing step 710 and are described in detail below.

Optionally, in step 715, a desired frame timing estimate is determined by searching a first signal path in a window around the fine frame timing estimate generated in step 710. For example, as described above, in order to further improve frame timing precision, system 500 optionally includes a search operator 565, as shown in FIG. 5. Search operator 565 will search the first real path in a searching window defined as $[\hat{\tau}-L_5, \hat{\tau}]$, where $\hat{\tau}$ is the fine frame timing estimate 560 generated by fine frame timing synchronizer 535, and output a desired timing estimate $\hat{\tau}$ 570. This search operation is defined above in equation (19).

FIG. 8 is a flowchart providing exemplary steps for implementing step 705 of method 700 for determining a coarse frame timing estimate in accordance with an exemplary embodiment of the present invention. In step 805, an auto-correlator output signal is generated based on a received signal. For example, auto-correlator 515 of coarse frame timing synchronizer 510 generates auto-correlator output signal $\Lambda_a(t)$ 520 based on received signal r(t) 505, as shown in FIG. 5. In this example, auto-correlator output signal $\Lambda_a(t)$ 520 is defined above in accordance with equations (10) and (11).

In step 810, a sliding window differentiator signal is generated based on the auto-correlator output signal. For example, sliding window differentiator 525 of coarse frame timing synchronizer 510 generates coarse frame timing estimate $\hat{\tau}_a$ 530 based on auto-correlator output signal $\Lambda_a(t)$ 520, as shown in FIG. 5. FIG. 9 provides exemplary steps for implementing step 810 and is described in detail below.

In step 815, a peak value of the sliding window differentiator signal is detected and, in step 820, the coarse frame timing estimate is determined based on a position of the detected peak value of the sliding window differentiator signal. For example, as described above in conjunction with FIG. 5, coarse frame timing synchronizer 510 performs peak detection and outputs coarse frame timing estimate $\hat{\tau}_a$ 530 in accordance with equation (8).

FIG. 9 is a flowchart providing exemplary steps for implementing step 810 of method 700 for generating a sliding window differentiator signal based on an auto-correlator output signal in accordance with an exemplary embodiment of the present invention. In step 905, first and second moving average windows are applied to the auto-correlator output signal to generate first and second moving average window output signals. In step 910, a difference between the first and second moving average window output signals is calculated to produce the sliding window differentiator signal. The sliding window differentiator signal has a peak at a timing position, which corresponds to the coarse frame timing estimate.

For example, as described above in conjunction with FIGS. 5 and 6, one purpose of sliding window differentiator 525 is to remove plateau 605 of the auto-correlator output signal $\Lambda_a(t)$, because, in the presence of channel noise, the peak of the auto-correlator output signal $\Lambda_a(t)$ can appear at any point on plateau 605 instead of at desired position $t_o$ 610. In this example, sliding window differentiator 525 is implemented as two moving average windows, which are separated by a predetermined amount M, which, in one embodiment, is the length of a STS (e.g., the length of STS 615). The outputs of the two moving average windows are subtracted to generate a peak 620 at desired position $t_o$ 610. The sliding window differentiator operation, which produces coarse frame timing estimate $\hat{\tau}_a$ 530, is defined above in accordance with equations (8) and (9).

FIG. 10 is a flowchart providing exemplary steps for implementing step 710 of method 700 for determining a fine frame timing estimate based on the coarse frame timing estimate in accordance with an exemplary embodiment of the present invention. In step 1005, a cross-correlator output signal is generated based on a received signal with carrier frequency offset compensation and a pilot signal. For example, as described above in conjunction with FIG. 5, fine frame timing synchronizer 535 includes cross-correlator 540, which generates cross-correlator output signal $\Lambda_c(t)$ 545 from received signal without carrier frequency offset compensation $\hat{r}(t)$ 580 and known LTS or STS samples in accordance with equations (6) and (7).

In step 1010, a SIR metric signal is generated based on the cross-correlator output signal generated in step 1005. For example, SIR metric calculator 550, shown in FIG. 5, calculates a SIR metric signal in accordance with equation (14). FIG. 11 provides exemplary steps for implementing step 1010 and is described in detail below.

In step 1015, a peak value of the SIR metric signal is detected. In step 1020, the fine frame timing estimate is determined based on a position of the peak value of the SIR metric signal detected in step 1015. As described above, due to the high complexity of the fine frame synchronization operations, these operations are performed only in a small window around the coarse frame timing estimate. For example, as described above in conjunction with FIG. 5, SIR metric calculator 550 performs a SIR metric calculator operation in accordance with equation (16). SIR metric calculator 550 searches SIR metric signal $\Psi(r)$ in a window $W_q$, which is calculated based on coarse frame timing estimate $\hat{\tau}_a$ 530, and outputs fine frame timing estimate $\hat{\tau}$ 560.

FIG. 11 is a flowchart providing exemplary steps for implementing step 1010 of method 700 for generating a SIR metric signal based on a cross-correlator output signal in accordance with an exemplary embodiment of the present invention. In step 1105, an amount of signal energy in a signal energy window is compared to an amount of interference energy in an interference window. Optionally, in step 1110, a length of the signal energy window and a length of the interference window are optimized.

For example, as described above in conjunction with FIG. 4, in one embodiment, the correct frame timing corresponds to the real starting point of the first LTS (e.g., see LTS 430 in FIG. 4). At the real starting point of the first LTS, the interference window will fall into the GI region, which means that the collected interference energy will be very small, and the signal energy window will cover almost all of the strongest real multi-paths, which means that the collected signal energy will be very large. Thus, the output of the SIR metric calculator, calculated in accordance with equation (15), achieves a maximum at the correct frame timing (i.e., the real starting point of the first LTS).

Optionally, in step 1115, a position of the interference window is adjusted based on a polarity of CDD values associated with a CDD scheme. For example, as described above in conjunction with FIG. 4, the CDD scheme introduces pseudo multi-paths, which can cause conventional cross-correlation synchronizers to fail. In order to mitigate error caused by pseudo multi-paths, SIR metric calculator 550, shown in FIG. 5, performs peak detection on the SIR metric signal instead of on the cross-correlator output signal. For positive CDD values, all of the pseudo multi-paths caused by the CDD scheme are behind the real channel paths and the SIR metric signal is defined in accordance with equation (15). In the case of negative CDD values, all of the pseudo multi-paths caused by the CDD scheme are ahead of the real channel paths and the SIR metric signal is defined in accordance with equation (18). Thus, depending on the polarity of the CDD values, interference window $W_i$ is either shifted ahead or behind of signal energy window $W_e$.

CONCLUSION

The present invention has been described with reference to a number of exemplary embodiments. However, it will be apparent to those skilled in the art that it is possible to embody the invention in specific forms other than those described above without departing from the spirit of the invention.

The methods and systems described herein can be implemented for pilot-aided OFDM systems, such as 802.11n proposals and conventional 802.11a/g WLAN systems, and can also be implemented with single carrier communication systems, which also use the pilot signal structure to perform synchronization. For example, the fine frame timing synchronization system and method described herein can be used in the Global System for Mobile Communications (GSM), in which the time slot synchronization is based on the training midamble sequence.

Accordingly, the various embodiments described herein are illustrative, and they should not be considered restrictive in any way. The scope of the invention is given by the appended claims, rather than the preceding description, and all variations and equivalents thereof that fall within the range of the claims are intended to be embraced therein.

What is claimed is:

1. A frame timing synchronization system, comprising:
   a coarse frame timing synchronizer, comprising:
      an auto-correlator that generates an auto-correlator output signal based on a received signal, and
      a sliding window differentiator that generates a sliding window differentiator signal, wherein the coarse frame timing synchronizer detects a peak value of the sliding window differentiator signal and generates a coarse frame timing estimate based on a timing position of the peak value of the sliding window differentiator signal, that is generated by applying first and second moving average windows to the auto-correlator output signal and calculating a difference of magnitude of auto-correlation values of the received signal during the first and second moving average windows; and
   a fine frame timing synchronizer that operates in a window around the coarse frame timing estimate, comprising:
      a cross-correlator that generates a cross-correlator output signal based on the received signal, wherein the received signal includes a sum of signals transmitted from a plurality of transmit antennas, and each of the signals from a respective one of the transmit antennas is a cyclic delayed version of an original modulated signal according to a cyclic delay diversity (CDD) scheme, and
      a signal-to-interference ratio (SIR) metric calculator that generates a SIR metric signal based on the cross-correlator output signal, wherein the SIR metric calculator compares an amount of signal energy in a signal energy window to an amount of interference energy in an interference window to mitigate an error associated with pseudo multi-paths introduced by the CDD scheme;
      wherein the fine frame timing synchronizer detects a peak value of the SIR metric signal and generates a fine frame timing estimate based on a timing position of the peak value of the SIR metric signal.

2. The frame timing synchronization system of claim 1, further comprising a search operator that generates a desired frame timing estimate by searching a window around the fine frame timing estimate.

3. The frame timing synchronization system of claim 1, wherein the second moving average window is separated from the first moving average window by a predetermined amount.

4. The frame timing synchronization system of claim 1, wherein the fine frame timing synchronizer further comprises a carrier frequency offset compensator that generates a received signal with carrier frequency offset compensation, and wherein the cross-correlator generates the cross-correlator output signal based on the received signal with carrier frequency offset compensation.

5. A frame timing synchronization system, comprising:
   a coarse frame timing synchronizer, comprising:
      an auto-correlator that generates an auto-correlator output signal based on a received signal, and a sliding window differentiator that generates a sliding window differentiator signal based on the auto-correlator output signal,
      wherein the coarse frame timing synchronizer detects a peak value of the sliding window differentiator signal and generates a coarse frame timing estimate based on a timing position of the peak value of the sliding window differentiator signal; and
   a fine frame timing synchronizer that operates in a window around the coarse frame timing estimate, comprising:
      a cross-correlator that generates a cross-correlator output signal based on the received signal, wherein the received signal includes a sum of signals transmitted from a plurality of transmit antennas, and each of the signals from a respective one of the transmit antennas is a cyclic delayed version of an original modulated signal according to a cyclic delay diversity (CDD) scheme; and
      a signal-to-interference ratio (SIR) metric calculator that generates a SIR metric signal based on the cross-correlator output signal, wherein the SIR metric calculator compares an amount of signal energy in a signal energy window to an amount of interference enemy in an interference window to mitigate an error associated with pseudo multi-paths introduced by the CDD scheme;
      wherein the fine frame timing synchronizer detects a peak value of the SIR metric signal and generates a fine frame timing estimate based on a timing position of the peak value of the SIR metric signal;
   wherein the sliding window differentiator signal is generated by applying first and second moving average windows to the auto-correlator output signal, and the second moving average window is separated from the first moving average window by a predetermined amount; and
wherein the predetermined amount corresponds to a length of a training symbol in the received signal.

6. The frame timing synchronization system of claim 5, wherein the received signal includes a plurality of long and short training symbols, and wherein the predetermined amount corresponds to a length of a short training symbol.

7. A fine frame timing synchronization system, comprising:
a cross-correlator that generates a cross-correlator output signal based on a received signal and a pilot signal, wherein the received signal includes a sum of signals transmitted from a plurality of transmit antennas, and each of the signals from a respective one of the transmit antennas is a cyclic delayed version of an original modulated signal according to a cyclic delay diversity (CDD) scheme; and
a signal-to-interference ratio (SIR) metric calculator that generates a SIR metric signal based on the cross-correlator output signal, wherein the SIR metric calculator compares an amount of signal energy in a signal energy window to an amount of interference energy in an interference window to mitigate an error associated with pseudo multi-paths introduced by the CDD scheme;
wherein the fine frame timing synchronizer generates a fine frame timing estimate based on a timing position of the peak value of the SIR metric signal; and
wherein the interference window and the signal energy window are different by at least one symbol timing.

8. The fine frame timing synchronization system of claim 7, further comprising a carrier frequency offset compensator that generates a received signal with carrier frequency offset compensation, wherein the cross-correlator generates the cross-correlator output signal based on the received signal with carrier frequency offset compensation and the pilot signal.

9. The fine frame timing synchronization system of claim 7, wherein the SIR metric calculator optimizes a length of the signal energy window and a length of the interference window.

10. The fine frame timing synchronization system of claim 7, wherein the interference window precedes the signal energy window.

11. A fine frame timing synchronization system, comprising:
a cross-correlator that generates a cross-correlator output signal based on a received signal and a pilot signal, and a signal-to-interference ratio (SIR) metric calculator that generates a SIR metric signal based on the cross-correlator output signal,
wherein the fine frame timing synchronizer generates a fine frame timing estimate based on a timing position of the peak value of the SIR metric signal;
wherein the SIR metric calculator compares an amount of signal energy in a signal energy window to an amount of interference energy in an interference window to mitigate an error associated with pseudo multi-paths introduced by a cyclic delay diversity (CDD) scheme; and
wherein the SIR metric calculator adjusts a position of the interference window based on a polarity of CDD values associated with the CDD scheme.

12. A frame timing synchronization method, comprising:
determining a coarse frame timing estimate, comprising:
generating a sliding window differentiator signal based on an auto-correlator output signal, and
detecting a peak value of the sliding window differentiator signal, wherein a timing position of the peak value of the sliding window differentiator signal corresponds to the coarse frame timing estimate, the sliding window differentiator signal is generated by applying first and second moving average windows to the auto-correlator output signal and calculating a difference of magnitude of auto-correlation values of the received signal during the first and second moving average windows; and
determining a fine frame timing estimate in a window around the coarse frame timing estimate, comprising:
generating a cross-correlator output signal based on the received signal, wherein the received signal includes a sum of signals transmitted from a plurality of transmit antennas, and each of the signals from a respective one of the transmit antennas is a cyclic delayed version of an original modulated signal according to a cyclic delay diversity (CDD) scheme, and
generating a signal-to-interference ratio (SIR) metric signal based on a the cross-correlator output signal, wherein the generating the SIR metric signal comprises comparing an amount of signal energy in a signal energy window to an amount of interference energy in an interference window to mitigate an error associated with pseudo multi-paths introduced by the CDD scheme; and
detecting a peak value of the SIR metric signal, wherein a timing position of the peak value of the SIR metric signal corresponds to the fine frame timing estimate.

13. The method of claim 12, further comprising determining a desired frame timing estimate by searching a window around the fine frame timing estimate.

14. The method of claim 12, wherein the second moving average window is separated from the first moving average window by a predetermined amount.

15. The method of claim 12, wherein the generating a sliding window differentiator signal step comprises mitigating an error associated with a plateau of the auto-correlator output signal.

16. The method of claim 12, wherein the generating a SIR metric signal step further comprises optimizing a length of the signal energy window and a length of the interference window.

17. A fine frame timing synchronization method, comprising:
generating a cross-correlator output signal based on a received signal and a pilot signal; wherein the received signal includes a sum of signals transmitted from a plurality of transmit antennas, and each of the signals from a respective one of the transmit antennas is a cyclic delayed version of an original modulated signal according to a cyclic delay diversity (CDD) scheme;
calculating a signal-to-interference ratio (SIR) metric signal based on the cross-correlator output signal; wherein the calculating comprises comparing an amount of signal energy in a signal energy window to an amount of interference energy in an interference window to mitigate an error associated with pseudo multi-paths introduced by the CDD scheme
detecting a peak value of the SIR metric signal; and
determining a fine frame timing estimate based on a timing position of the peak value of the SIR metric signal;
wherein the SIR metric signal is calculated based on an amount of signal energy in a signal energy window and an amount of interference energy in an interference window, and the interference window and the signal energy window are different at least by one symbol timing.

18. The method of claim 17, further comprising generating a received signal with carrier frequency offset compensation, wherein the generating a cross-correlator output signal step comprises generating a cross-correlator output signal based on the received signal with carrier frequency offset compensation and the pilot signal.

19. The method of claim 17, wherein the calculating a SIR metric signal step further comprises optimizing a length of the signal energy window and a length of the interference window.

20. The method of claim 17, wherein the interference window precedes the signal energy.

21. A fine frame timing synchronization method, comprising:

generating a cross-correlator output signal based on a received signal and a pilot signal;

calculating a signal-to-interference ratio (SIR) metric signal based on the cross-correlator output signal;

detecting a peak value of the SIR metric signal; and determining a fine frame timing estimate based on a timing position of the peak value of the SIR metric signal;

wherein the SIR metric signal is calculated based on an amount of signal energy in a signal energy window and an amount of interference energy in an interference window, and the interference window and the signal energy window are different at least by one symbol timing;

wherein the calculating a SIR metric signal step mitigates an error associated with pseudo multi-paths introduced by a cyclic delay diversity (CDD) scheme;

wherein the generating a SIR metric signal step further comprises adjusting a position of the interference window based on a polarity of CDD values associated with the CDD scheme.

* * * * *